United States Patent [19]

Snijders

[11] 4,334,128
[45] Jun. 8, 1982

[54] ECHO CANCELER FOR HOMOCHRONOUS DATA TRANSMISSION SYSTEMS

[75] Inventor: Wilfred A. M. Snijders, Eindhoven, Netherlands

[73] Assignee: U.S. Philips Corporation, New York, N.Y.

[21] Appl. No.: 128,418

[22] Filed: Mar. 10, 1980

[30] Foreign Application Priority Data

Mar. 15, 1979 [NL] Netherlands .......................... 7902053

[51] Int. Cl.³ ............................................. H04B 3/20
[52] U.S. Cl. ................................................ 179/170.2
[58] Field of Search ................. 179/170.2, 170.6, 170.8

[56] References Cited

U.S. PATENT DOCUMENTS

| | | | |
|---|---|---|---|
| 3,789,165 | 1/1974 | Campanella et al. | 179/170.2 |
| 4,007,341 | 2/1977 | Sourgens et al. | 179/170.2 |
| 4,117,277 | 9/1978 | Van Den Elzen et al. | 179/170.6 |
| 4,129,753 | 12/1978 | Duttweiler | 179/170.6 |

*Primary Examiner*—Vincent P. Canney
*Assistant Examiner*—Randall P. Myers
*Attorney, Agent, or Firm*—Thomas A. Briody; William J. Streeter; Edward W. Goodman

[57] ABSTRACT

Echo canceller for use in a homochronous data transmission system, comprising two-wire and four-wire connections and arranged for suppressing echo signals occurring in the four-wire connection. This echo canceller comprises an adjustable signal processing arrangement to which the data signal to be transmitted is applied and which produces a synthetic echo signal. A signal formed by a received data signal and an echo signal is present in the receive path of the four-wire connection. To generate a residual signal, the synthetic echo signal is subtracted from the signals in the receive path.

For the adjustment of the signal processing arrangement there is added to this residual signal, outside the receive path of the four-wire connection, an auxiliary signal which is not correlated to this residual signal. The sum signal thus obtained is sampled with a suitably chosen sampling rate which is harmonically related to the symbol rate. The signal samples obtained are applied to a limiter circuit which converts each signal sample into a positive or a negative pulse, which is indicative of the polarity of the signal sample. The pulses thus obtained are applied as the control signal to an adjusting device for adjusting the signal processing arrangement.

1 Claim, 5 Drawing Figures

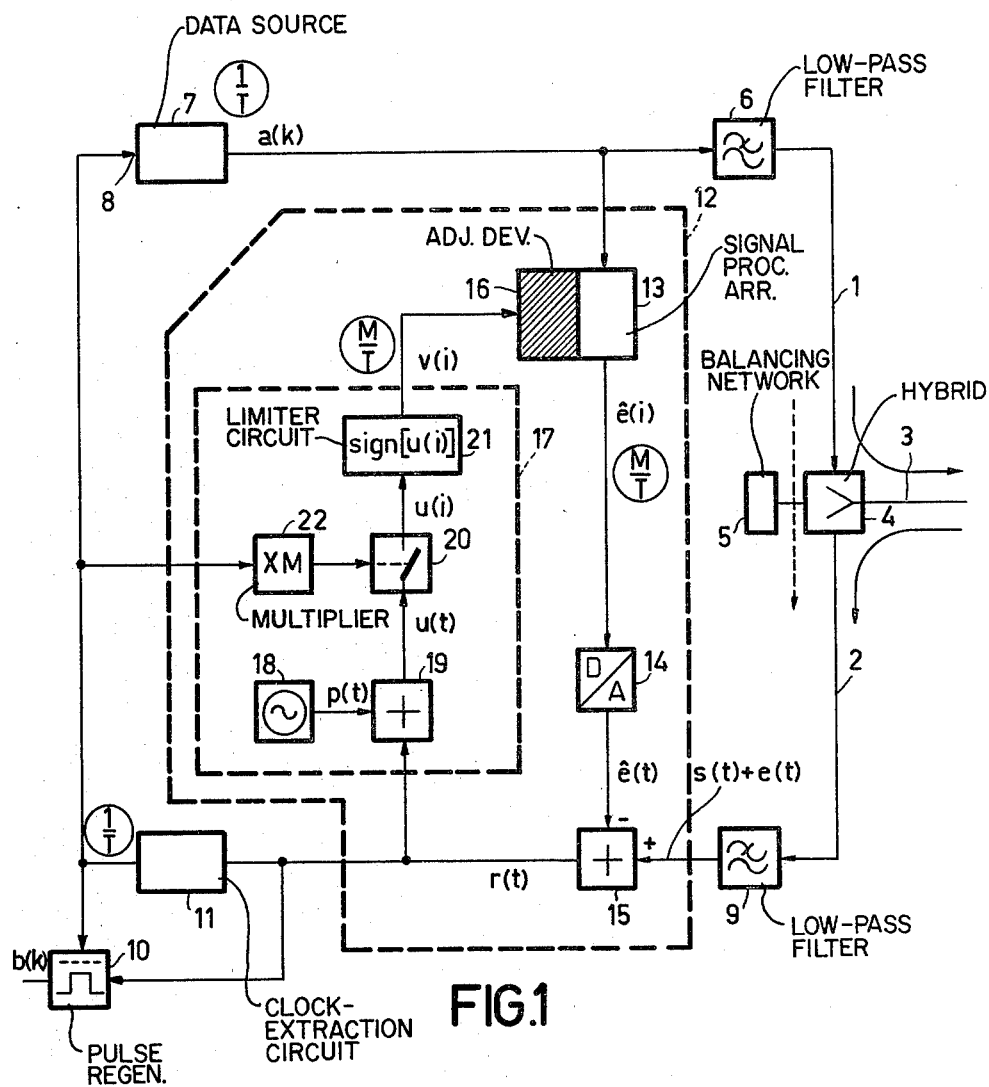
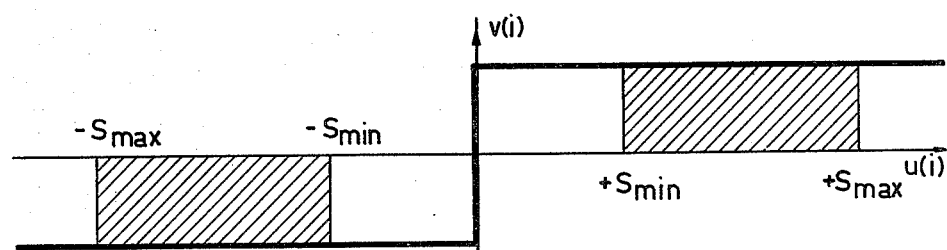

ECHO CANCELER FOR HOMOCHRONOUS DATA TRANSMISSION SYSTEMS

BACKGROUND OF THE INVENTION (1) Field of the Invention

The invention relates to an echo canceler particularly for use in a data modem for simultaneous two-way transmission of data signals over two-wire connections.

(2) Description of the Prior Art

Usually, modern transmission systems consist of a combination of two-wire and four-wire connections. Four-wire connections consist of two one-way paths, namely a one-way transmit path and a one-way receive path. A two-wire connection is constituted by a two-way path over which signals can be simultaneously transmitted into two directions in one and the same frequency band. These different paths are interconnected by means of a hybrid.

As known, a hybrid is constituted by a four-port circuit. A first port, the so-called transmit-port, is connected to the one-way transmit path, a second port, the so-called receive-port, is connected to the one-way receive path, a third port, the so-called cable port is connected to the two-way path and a balancing network is connected to the fourth port, the so-called balancing port. This balancing network is intended to match the hybrid to the cable impedance. When this balancing network is perfectly adjusted, a signal in the transmit path will appear only at the cable port. If, on the contrary, a signal is applied to the cable port over the two-way path, this signal will only appear in the receive path.

As each two-way path has one or more discontinuities from which a signal can be reflected, a reflected version of the signal occurring in the transmit path may be expected in the receive path.

Owing to the diverse cable lengths and cable types, the cable impedance is usually not exactly known, so that a perfect adjustment of the balancing network is impossible. Consequently, a portion of the signal occurring in the transmit path will directly enter the receive path via the hybrid.

Those portions of the signal present in the transmit path and occurring in the receive path will, as customary, be denoted as echo signal.

Such echo signals have a particularly negative influence on the quality of the signal in the receive path. In order to improve this quality, circuits have been designed to cancel the echo signals or at least to reduce the influence to a considerable extent. Such circuits are known as echo cancelers.

Reference 1 of paragraph D shows that an echo canceler usually comprises:
- an adjustable signal processing arrangement coupled to the one-way transmit path;
- a difference producer connected to the one-way receive path for generating a residual signal which indicates the difference between the signal occurring in the receive path and the signal produced by the signal processing arrangement;
- an adjusting device responsive to control signals for adjusting the signal processing arrangement;
- a control signal generator for generating the above-mentioned control signals and being responsive to the above-mentioned residual signal.

Starting from a signal occurring in the transmit path, the signal processing arrangement generates a synthetic echo signal, the shape of which corresponds as closely as possible with the echo signal to be expected. The degree of similarity between the synthetic echo signal and the real echo signal is determined by the setting of the signal processing arrangement which is catered for by the adjusting device to which the output signal of the control signal generator is applied. This adjusting device and this control signal generator are usually constructed so that they are capable of deriving from the residual signal a signal which is a measure of the nonsuppressed echo signal present in the residual signal, the so-called residual echo, and of so adjusting the signal processing arrangement in an iterative manner by means of this signal that a minimum value is obtained of the mean square value of the residual echo.

Reference 1 proposes in particular to provide the control signal generator with a limiting circuit to which the residual signal is applied, this limiting circuit converting this signal into a sequence of positive and negative pulses, which are indicative of the polarity of this residual signal. The pulse train thus obtained is now applied to the adjusting device by way of control signal.

Such a construction of a control signal generator is particularly useful when the echo canceller must be implemented by means of digital modules only, (see for example, references 2 and 3). The limiting circuit constitutes, namely, a particularly simple analog-to-digital converter for the analog residual signal.

However, Applicants have now ascertained that, although the limiting circuit can be used very successfully to digitize the residual signal in a digital echo canceller used in a so-called plesiochronous transmission system, such a digitization in an echo canceller intended to be used in a so-called homochronous transmission system results in an insufficient compensation of the echo signal. In such circumstances a limiting circuit must be replaced by an analog-to-digital converter, which converts the residual signal into a sequence of code words each comprising a greater number of bits. However, such an analog-to-digital converter is relatively costly, it dissipates much energy and is an element which is difficult to integrate.

Short Description of the Invention

It is an object of the invention to render an echo canceller, in which a limiting circuit is used to digitize the residual signal, in a simple manner suitable for use in a homochronous digital transmission system.

According to the invention the control signal generator does not only comprise above-mentioned limiting circuit but is also provided with:
- a generation device for generating an auxiliary signal which is not correlated to the residual signal;
- an adding device for adding the auxiliary signal and the residual signal together for generating a limiter input signal which is applied to the limiter circuit.

SHORT DESCRIPTION OF THE FIGURES

FIG. 1 shows schematically a portion of a homochronous data transmission system;

FIG. 2 shows the quantization characteristic of a limiter circuit;

REFERENCES

Figure 3:
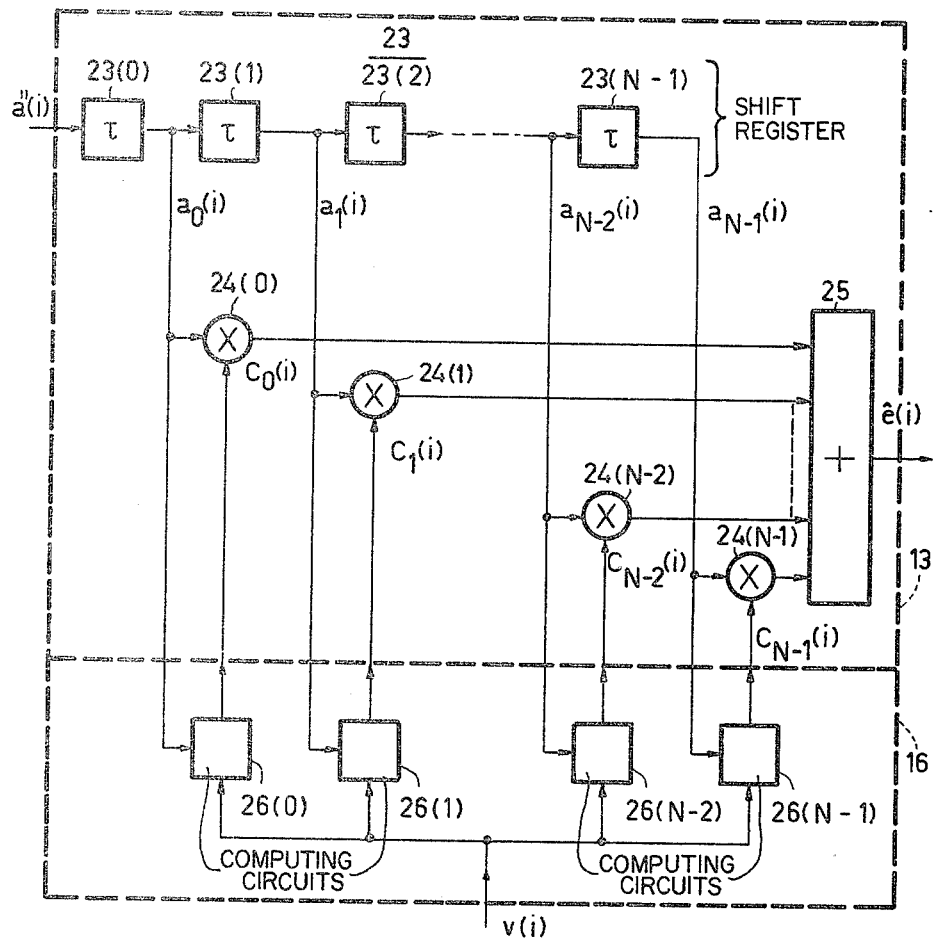
FIG. 3 shows an embodiment of an adjustable signal processing device and an adjusting device.

1. Closed loop adaptive echo canceller using generalized filter networks; U.S. Pat. No. 3,499,999.
2. A new digital echo canceller for two-wire full-duplex data transmission; K. H. Müller; IEEE Transactions on Communications, Vol. COM-24, No. 9, September 1976, pages 956-962.
3. A passband data-driven echo canceller for full-duplex transmission on two-wire circuits; S. B. Weinstein; IEEE Transactions on Communications, Vol. COM-25, No. 7, July 1977, pages 654-666.
4. Arrangement for converting discrete signals into a discrete single-sideband frequency division-multiplex signal and vice versa; U.S. Pat. No. 4,131,764.
5. Low-pass nonrecursive Digital filter; U.S. Pat. No. 3,928,755.
6. Parallel realizations of digital interpolation filters for increasing the sampling rate; H. Urkowitz; IEEE Transactions on circuits and systems, Vol. CAS-22, No. 2, February 1975, pages 146-154.
7. Nine digital filters for decimation and interpolation; D. J. Goodman, M. J. Carey; IEEE Transactions on Acoustics, speech, and signal processing, Vol. ASSP-25, No. 2, April 1977, pages 121-126.
8. Digital echo canceller for a modem for data transmission by means of modulation of a carrier; U.S. Pat. No. 4,162,378.

Definitions

1. Two signals are homochronous when corresponding significant instants have a constant, fixed, phase relationship.
2. Two signals are plesiochronous, when corresponding significant instants occur with the same nominal rate (two signals having the same nominal bit rate but which do not originate from the same clock, or of homochronous clocks, are usually plesiochronous).
3. A homochronous transmission system is a system for the transmission of signals into two opposite directions, signals which are transmitted into one direction being homochronous with signals transmitted into the opposite direction.

DESCRIPTION OF THE EMBODIMENTS

Construction

FIG. 1 shows block schematically a portion of a homochronous data transmission system. This system consists of a one-way transmit path 1, a one-way receive path 2, as well as of a two-way path 3. These three paths are interconnected by means of a hybrid 4, a balancing network 5 also being connected to this hybrid to match the impedance of the hybrid to that of the two-way path.

In the transmission system shown the transmit path 1 includes a low-pass filter 6. A data source 7 producing the data symbols a(k) is connected to the input of this transmit path. The quantity k represents the number of the data symbols. These data symbols occur at a rate 1/T. To this end a clock signal is applied to this data source via a clock signal input 8. The pulse repetition rate of this clock signal is also 1/T.

In the embodiment shown the one-way receive channel 2 comprises a low-pass filter 9 and a pulse regenerator 10. This pulse regenerator 10 is controlled by a clock signal the pulse repetition rate of which is also equal to 1/T. Data symbols b(k) occurring at a rate 1/T are now obtained at the output of pulse regenerator 10, these data symbols having been transmitted via the two-way path 3 by a remote data source to the hybrid 4, which applies the received data symbols to the one-way receive path 2.

The clock signal which is applied to the pulse regenerator 10 as well as to the data source 7 is generated by a clock-extraction circuit 11, which is coupled to the receive path 2 and which derives this clock signal from the signals occurring in this receive path 2.

As in practice the impedance of the two-way path 3 is not exactly known, the balancing network does not constitute a perfect termination of the hybrid 4. This results in a direct leakage from transmit path 1 to receive path 2 via this hybrid 4. In addition, impedance discontinuities in the two-way path 3 cause signal reflections. The result of these two effects is that echoes of the output signal of the low-pass filter 6 appear in the receive path 2.

In order to reduce the disturbing influences of these echo signals as much as possible, the transmission system shown in FIG. 1 comprises an echo canceller 12 provided with an adjustable signal processing arrangement 13, connected to the one-way transmit path 1. This signal processing arrangement 13 can be constructed in known manner as a digital filter with adjustable filter coefficients (see, for example, references 2 and 3), preferably as a non-recursive digital filter. This signal processing arrangement 13 produces a synthetic echo signal ê(i) in digital form, which is applied to a combining circuit 15 via a digital-to-analog converter 14 and is subtracted from the signals in the receive path 2. A residual signal r(t) which is predominantly free from echoes and which is applied to the pulse regenerator 10 now appears at the output of the combining circuit 15.

In order to enable adjustment of the signal processing arrangement 13, an adjusting device 16, to which a control signal v(i), produced by a control signal generator 17, is applied, is connected to the signal processing arrangement 13. Paragraph F(3) describes a possible construction of the signal processing arrangement 13 and the adjusting device 16 in greater detail.

The control signal generator 17 comprises an auxiliary signal generator 18 generating an auxiliary signal p(t) which is not correlated to the residual signal. In a combining circuit 19 this auxiliary signal is added to the residual signal r(t) and the sum signal u(t) thus obtained is applied to a limiter circuit 21 via a sampling circuit 20. The sampling circuit 20 is controlled by sampling pulses which are derived, by means of a frequency multiplier 22, from the clock pulses produced by the clock extraction circuit 11. The multiplier 22 has a multiplication factor M, so that the sampling pulses occur at a rate M/T. Hereinafter it will be assumed that M is an integer. In response to these sampling pulses the sampling device 20 produces samples u(i) of the signal u(t) and each of these samples is converted by the limiter circuit 21 into either a positive pulse or a negative pulse, depending on the polarity of the sample. The output signal v(i) of this limiter circuit 21 now serves as the control signal for the adjusting device 16.

Operation of the control signal generator

Before going into greater detail into the operation of the control signal generator 17 and, particularly, the influence of the auxiliary signal p(t) produced by the auxiliary signal generator 18, the following should be noted.

A signal x(t) is harmonically related to a frequency $f_o$ if the harmonics of which x(t) is made up have a frequency equal to $nf_o$ and/or $f_o/k$ for all integral values of n and k.

Hereinafter it will be assumed that the signal u(t) which is applied to the sampling circuit 20 has an instantaneous value for which it always holds that:

$$-U_{max} \leq u(t) \leq +U_{max}$$

When u(t) is sampled at a rate which is not harmonically related to the symbol rate 1/T then it holds for u(i) that:

$$-U_{max} \leq u(i) \leq +U_{max}$$

When u(t) is sampled at a rate which is harmonically related to the symbol rate 1/T, the sequence of samples u(i) is a periodic sequence, each period containing M samples. If the absolute value of the smallest sample is represented by $U_{min}$ then it holds that:

$$U_{min} \leq |u(i)| \leq U_{max}$$

The limiter circuit 21 always produces a positive pulse when u(i) is positive and a negative pulse when u(i) is negative.

By way of illustration FIG. 2 shows the quantizing characteristic of the limiter circuit 21.

If it is now assumed that the residual signal r(t) is constituted by a data signal s(t) only, which is transmitted from east to west, then it holds that r(t)=s(t) and if it is assumed that this residual signal is directly applied to the sampling device 20, it further holds that: u(t)=s(t); that: u(i)=s(i) and that v(i)=sign [s(i)]. Hereinafter it will also be assumed that: $-S_{max} \leq s(t) \leq +S_{max}$.

The data signal s(t) has a symbol rate 1/T which is thus harmonically related to the sampling frequency M/T. From the above it then follows that: $S_{min} \leq |s(i)| \leq S_{max}$. Therefore, it may be assumed that $U_{min}=S_{min}$ and $U_{max}=S_{max}$. By way of illustration FIG. 2 shows, by means of hatching, the areas for which it holds that $S_{min} \leq |s(i)| \leq S_{max}$.

The control circuit 16 is now constructed so that the output pulses v(i)=sign [s(I)], produced by the limiter circuit to adjust the signal processing arrangement 13 that the synthetic echo signal ê(i), and also the received echo signal e(t), is approximately equal to zero.

If now an echo signal e(t) is added to the data signal s(t) and if it is assumed that e(t) is unequal to zero the residual signal is defined by:

$$r(t) = s(t) + e(t) - ê(t)$$

so that $$u(t) = s(t) + e(t) - ê(t)$$

$$u(i) = s(i) + e(i) - ê(i)$$

$$v(i) = \text{sign } [s(i) + e(i) - ê(i)]$$

As both e(t) and ê(t) are amplitude-limited functions, also the amplitude of the function e(t)−ê(t) is limited.

The function e(t)−ê(t) is called residual echo and will be represented ẽ(t). For this residual echo it can be assumed that $-B_{max} \leq ẽ(t) \leq +B_{max}$. As e(t) and ê(t) may both be considered to be a data signal whose symbols occur at a rate 1/T, also the residual echo may be considered thus. In the present homochronous transmission system in which the residual echo is sampled at a rate M/T, which is thus harmonically related to 1/T, it then holds that: $B_{min} \leq |ẽ(i)| \leq B_{max}$.

As follows from the expression for v(i) the value of the output pulse v(i) is determined by the polarity of the highest signal value, in other words v(i) is determined by the polarity of s(i) if $|s(i)| \geq |ẽ(i)|$, but if $|s(i)| < |ẽ(i)|$, v(i) is then determined by the polarity of ẽ(i). From this it follows that:

When the signal processing arrangement 13 is adjusted so that the maximum value $B_{max}$ the residual echo ẽ(i) can assume is smaller than $S_{min}$, so $B_{max} < S_{min}$, then v(i) is only determined by s(i). The result is that the adjustment of the signal processing arrangement 13 does not change, not even if $B_{max}$ is substantially equal to $S_{min}$. This means that the greater $S_{min}$, the greater is also the residual echo.

When the signal processing arrangement 13 is adjusted so that the maximum value $B_{max}$ which the residual echo e(i) can assume is higher than $S_{min}$, so $B_{max} > S_{min}$, then v(i) is determined by s(i) if $|s(i)| > B_{max}$ and by ẽ(i) if $|s(i)| < B_{max}$. The output signal v(i) of the limiter circuit 21 now contains information about the data signal as well as about the residual echo ẽ(i). The signal processing arrangement 13 will now be adjusted so that it produces a synthetic echo signal ê(i), such that the residual echo ẽ(t) is reduced until it has an amplitude which is approximately equal to $S_{min}$.

Since $S_{min}$ is determined by the phase of the sampling pulses applied to the sampling device 20, the amplitude value of the residual echo cannot be predetermined. In order to ensure that the amplitude value of the residual echo will always become smaller than $S_{min}$, the residual signal r(t) is now not directly applied to the sampling circuit 20 as shown in FIG. 1, but an auxiliary signal p(t) is added to this residual signal. It is now assumed that this auxiliary signal is not correlated to r(t).

It appears that a sinusoidal signal can now be advantageously used as the auxiliary signal, preference being given to a triangular signal. However, both signals must satisfy the condition that their rate is not harmonically related to the symbol rate 1/T.

The sampling circuit 20 now produces samples u(i) for which it holds that: u(i)=s(i)+p(i)+e(i)−ê(i). As p(t) is not harmonically related to 1/T the absolute value of s(i)+p(i) will generally be higher than a value $D_{min}$ and lower than a value $D_{max}$. The amplitude of p(t) can now be chosen so that $D_{min}$ is much smaller than $S_{min}$. It now follows from the preceding that the signal processing arrangement 13 will be adjusted so that the amplitude of the residual echo ẽ(t) does not exceed $D_{min}$. If the amplitude of p(t) is chosen approximately equal to $S_{max}$ then $D_{min}$ becomes approximately equal to zero and, consequently, also the value of the residual echo ẽ(t).

Signal processing arrangement and adjusting device

FIG. 3 shows an embodiment of a signal processing arrangement 13 for use in the transmission system shown in FIG. 1. This signal processing arrangement 13 comprises a shift register 23 to which data symbols a″(i) are applied. This shift register 23 comprises N shift register element 23(0), 23(1), . . . 23(N-1), each having a time delay τ. The output of the shift register element 23(q) is connected to the input of a multiplying device 24(q). Herein q represents a number of the set 0, 1, 2, . . . N-1. The multiplying-device 24(q) is now not only supplied with the data symbols $a_q(i)$ supplied by the shift register element 23(q) but also with coefficients $C_q(i)$, which are generated by the adjusting device 16. The N products which are simultaneously produced by the N multiplying devices 24(q) are added together in an adding circuit 25 and the sum of these N products becomes available at the output of this adding circuit 25 in the form of a synthetic echo signal sample $\hat{e}(i)$.

As mentioned above the coefficients $C_q(i)$ are generated by the adjusting device 16. To this end this adjusting device 16 comprises N computing circuits 26(0), 26(1), 26(2), . . . 26(N-1). The digital output signal v(i) of the limiter circuit 21 and also the output signal $a_q(i)$ of the shift register element 23(q) are applied to each of these computing circuits 26(q).

Figure 4:
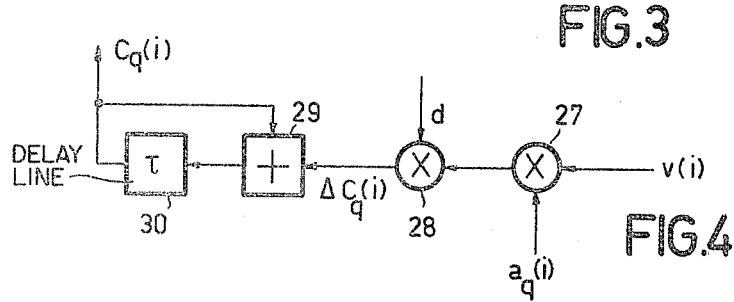
FIG. 4 shows in greater detail an embodiment of a computation circuit for use in the adjusting device of FIG. 4.

FIG. 4 shows in greater detail an embodiment of the computing circuit 26(q). This computing circuit comprises a multiplier 27 to which the pulses v(i) as well as the data symbols $a_q(i)$ are applied. The product $v(i).a_q(i)$ is multiplied in a second multiplier 28 by a factor of d, whose absolute value is smaller than 1, for generating a product $d.v(i).a_q(i)$ which will be indicated by $\Delta C_q(i)$ and which indicates the amount by which $C_q(i)$ must be changed in order to further reduce the residual echo $\tilde{e}(t)$. To that end these numbers $\Delta C_q(i)$ are applied to an accumulator which is formed in known manner by an adder 29 and a delay line 30 having a time delay $\tau$. In response to the number $\Delta C_q(i)$ applied to it, this accumulator produces the coefficient $C_q(i+1)$ which is equal to $C_q(i)+\Delta C_q(i)$.

Figure 5:
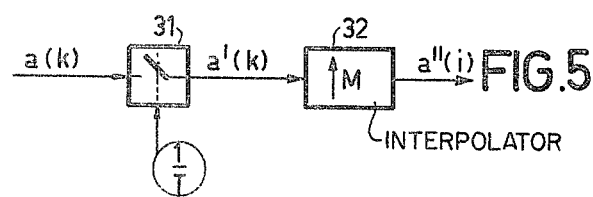
FIG. 5 shows schematically an input circuit of the signal processing device when the sampling rate of the residual signal is M-times higher than the symbol rate.

If in the transmission system shown in FIG. 1 the multiplying factor M is chosen above 1, the time delay $\tau$ of the shift register elements 23(q) and the delay line 30 becomes equal to T/M and the pulses v(i) occur at a rate M/T. The data symbols a(k) can not now be applied directly to the shift register 23, but they must be converted in an input circuit into auxiliary data symbols a''(i) which occur at a rate M/T. In the manner shown in reference 3, this input circuit can be constituted by a M position switch. In the art of digital signal processing it is customary to implement this input circuit in the manner as shown in FIG. 5 in order to obtain the desired result. The data symbols a(k) are then sampled by means of a sampling device 31 and the samples thus obtained are applied to an interpolator 32. Sampling pulses occurring at a rate 1/T and supplied by the clock extraction circuit 11 shown in FIG. 1, are applied to the sampling device 31. Thus, this sampling device 31 produces at the instant kT only a signal sample a'(k) whose size is equal to a(k). These signal samples a'(k) are applied to the interpolator 32 which is arranged to insert M-1 samples with the amplitude value zero (see also reference 4) between every two consecutive samples a'(k). There now occurs at the output of this interpolator the digital signal a''(i) for which it holds that:

a''(i)=a'(i/M) for i=O, ±M, ±2M . . . and a''(i) for all other values of i. As stated already in reference 4, the cascade circuit of the interpolator 32 and the digital filter 23 is called interpolating digital filter. In practical embodiments of an interpolating digital filter the function of the interpolator and the function of the digital filter are interwoven. For the implementation of an interpolating digital filter reference is made to the references 5, 6 and 7.

general remarks

1. In FIG. 1 the data symbols a(k) are applied to a low-pass filter 6 before these data symbols are applied to the hybrid 4. The filter 6 is then usually dimensioned so that its output signal is located in the so-called baseband. This situation is called baseband data transmission.

Another known transmission mode, in addition to baseband data transmission is the speech band data transmission. In that case a modulation device must be included in the data source 7 and the filter 6, this modulation device ensuring that the data signal applied to the hybrid 4 is located in the frequency band from 300 to 3400 Hz.

2. When the above-mentioned modulation device is provided in the transmit path between the output of the data source 7 and the point in which the signal processing arrangement 13 is connected to the transmit path, it will usually be necessary to provide, for the cascade arrangement shown in FIG. 5, an analog-to-digital converter producing multi-bit code words between the sampling device 31 and the interpolator 32.

3. The above-mentioned modulation device may also be arranged in the transmit path between the point in which the signal processing arrangement 13 is connected to this transmit path 1 and the filter 6. In these circumstances also the signal processing arrangement 13 will have to perform a modulation process. This signal processing arrangement can then be realized in the manner described in reference 3 or as described in reference 8.

4. A linear coding network such as, for example, a biphase coder or, for example, a so-called AMI-coder, or, for example, a bipolar coder may be provided between the point in which the signal processing arrangement 13 is connected to the transmit path 1 and the filter 6. When such a coding network is employed it is not an absolute requirement that this filter 6 is provided.

5. Alternatively, in addition to the manner shown in FIG. 1, the combining circuit 19 may be provided between the output of the sampling circuit 20 and the input of the limiter circuit 21.

6. Alternatively, instead of being connected to the input of the limiter circuit 21 as shown in FIG. 1, the sampling circuit may be connected to the output of this limiter circuit.

What is claimed is:
1. An echo canceller including:
an adjustable signal processing arrangement connected to a first one-way transmission path out of two one-way transmission paths of a transmission system for producing a synthetic echo signal;
first combining means connected to the second one-way transmission path of said two one-way transmission paths for combining signals occurring in the second one-way transmission path with the synthetic echo signals produced by the signal processing arrangement for generating residual signals;
adjusting means responsive to control signals for adjusting the signal processing arrangement; and
control signal generating means responsive to said residual signals and comprising limiter means for converting the limiter input signals applied thereto into a train of positive and negative pulses which are indicative of the polarity of the limiter input signal, these pulses being applied as control signal to the said adjusting means, characterized in that the said control signal generating means further comprise:

generating means for generating an auxiliary signal which is uncorrelated to the residual signals; and second combining means arranged for algebraically combining the auxiliary signal with the residual signals for generating the limiter input signal.

* * * * *